United States Patent [19]
Sugaya et al.

[11] 4,122,499
[45] Oct. 24, 1978

[54] VIDEO SIGNAL RECORDING AND REPRODUCING SYSTEM FOR SPECIAL MOTION EFFECTS

[75] Inventors: Hiroshi Sugaya, Suita; Kenji Kanai, Higashiosaka, both of Japan

[73] Assignee: Matsushita Electric Industrial Co., Ltd., Japan

[21] Appl. No.: 685,855

[22] Filed: Nov. 27, 1967

[30] Foreign Application Priority Data

| Dec. 6, 1966 [JP] | Japan | 41-80499 |
| Dec. 6, 1966 [JP] | Japan | 41-80500 |
| Dec. 20, 1966 [JP] | Japan | 41-85096 |
| Dec. 20, 1966 [JP] | Japan | 41-85097 |
| Dec. 27, 1966 [JP] | Japan | 42-904 |
| May 12, 1967 [JP] | Japan | 42-30484 |
| Jul. 7, 1967 [JP] | Japan | 42-44922 |

[51] Int. Cl.$^2$ .......................... H04N 5/79; H04N 5/795
[52] U.S. Cl. ........................................ 360/10; 360/35
[58] Field of Search ............... 178/6.6 A, 6 B, 6 WR; 340/174.1 C; 179/100.2 T; 360/10, 11, 35

[56] References Cited

U.S. PATENT DOCUMENTS

| 2,737,646 | 3/1956 | Muffly | 178/6.6 |
| 2,800,642 | 7/1957 | May | 340/174.1 |
| 3,007,144 | 10/1961 | Hagopian | 340/174.1 |
| 3,170,031 | 2/1965 | Okamura | 178/6.6 |
| 3,294,902 | 12/1966 | Maxey | 178/6.6 |
| 3,359,365 | 12/1967 | Kihara | 178/6 |
| 3,375,331 | 3/1968 | Okazaki et al. | 179/100.2 |
| 3,397,283 | 8/1968 | Stosberg et al. | 178/6.6 |

FOREIGN PATENT DOCUMENTS 812,468 4/1959 United Kingdom ..................... 360/10

OTHER PUBLICATIONS

Japanese Publication No. SHO 38-17909, 9/63.

Primary Examiner—Raymond F. Cardillo, Jr.
Attorney, Agent, or Firm—Stevens, Davis, Miller & Mosher

[57] ABSTRACT

A video signal recording and reproducing system having a recording disc or cylinder which is rotated substantially in synchronism with the period or one-mth (m is an integer) the period of the vertical synchronizing signal in a video signal, and a magnetic head which is intermittently movable within a one-field period in a certain relation with the vertical synchronizing signal. In the system, a series of signal portions each representing at least one field of the video signal and spaced from each other by a time which is p times (p is an integer) the length of one field are successively concentrically recorded on the disc or cylinder, and the concentrically recorded tracks are successively reproduced while repeating the reproduction on each track a plurality of times.

5 Claims, 25 Drawing Figures

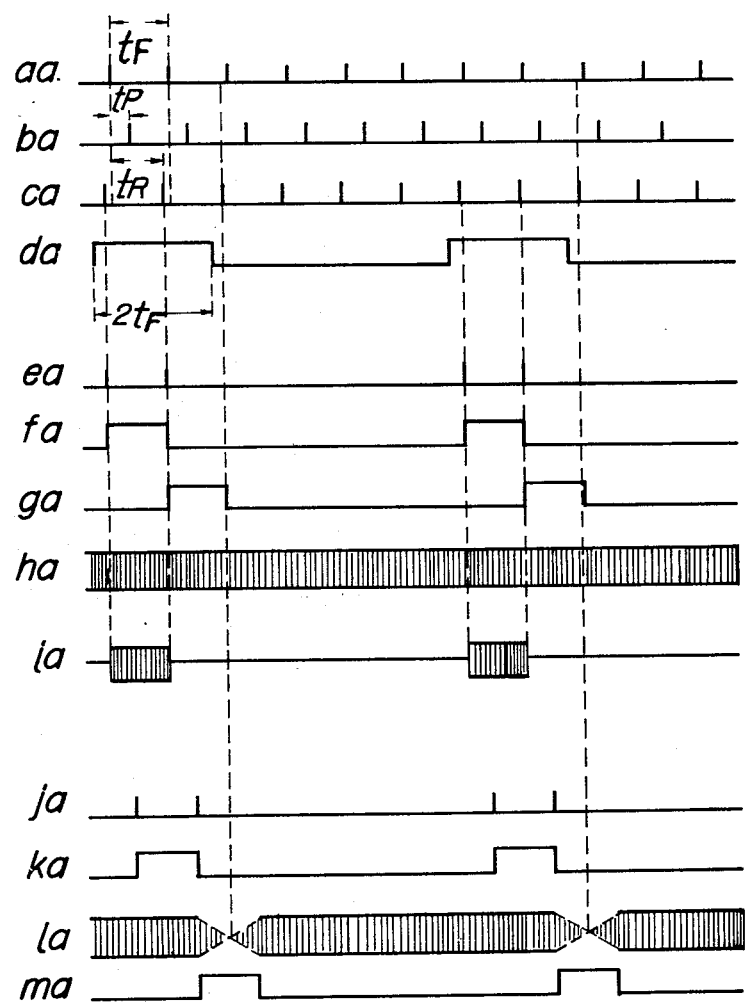

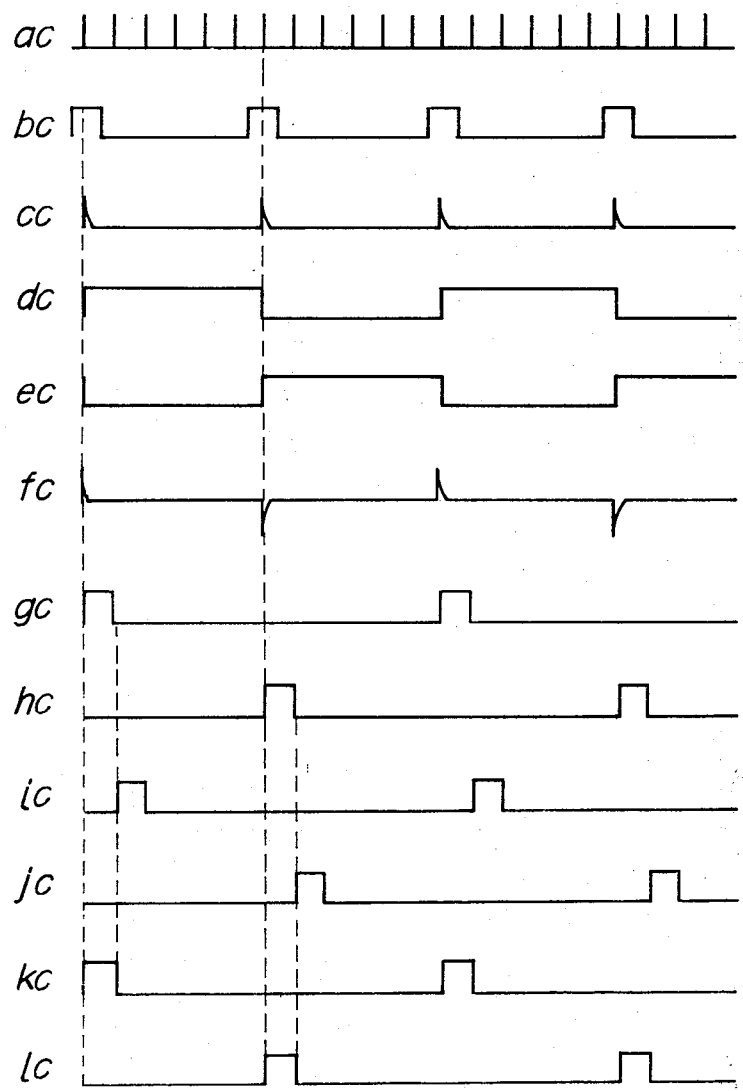

VIDEO SIGNAL RECORDING AND REPRODUCING SYSTEM FOR SPECIAL MOTION EFFECTS

This invention relates to a system for recording a video signal on, and reproducing such a signal from, a discal or cylindrical recording medium, and contemplates the provision of a recording and reproducing system of the kind described by which the recorded signal can be reproduced as a slow-motion picture of any desired speed or a stationary picture if so required.

Heretofore, a very expensive and complex memory device was required for the successful reproduction of a slow-motion picture or a stationary picture from a video signal recorded in a video tape recorder of, for example, the four-head type commonly used in broadcasting stations. On the other hand, in a simplified video tape recorder of the two-head type adapted for helical scanning, the tape running speed during reproduction has to be made slower than in the recording or the tape drive had to be stopped during the playback stage for the successful reproduction of a slow-motion picture or a stationary picture from a recorded video signal, and it was thus difficult to obtain a perfectly reproduced picture with such a simplified video tape recorder.

A memory device proposed for use in combination with such a simplified video tape recorder was in the form of a recording disc 1, as shown in FIG. 1, on which a continuous recording of a video signal was provided by helical scanning although the recording so provided could give a reproduced picture of a shorter time than in the past. However, the prior procedure for reproducing the helical recording as a slow-motion picture or a stationary picture necessarily required the continuous scanning from an inner track to an outer track past a portion which does not carry any recording thereon. For the above reason, the point of switch-over between the tracks was reproduced on the picture as a noise, and thus it was hardly possible to effect the successful reproduction of a perfect slow-motion picture.

With a view to eliminate the prior defect described above, the present invention contemplates to discontinuously record a video signal in the form of a concentric circles on a disc as shown in FIG. 2 and to record the video signal in such a way that the circumference of each circle corresponds to a video signal portion which is $n$ times the length of one field where $n$ is an integer. In order to successively record a video signal in a discontinuous fashion as concentric circles in this manner, a recording head which can be moved discontinuously in a short period of time must be provided, and such a recording head becomes an indispensable element for the realization of the purpose described above.

For the attainment of the above purpose, an arrangement may be made in which a recording medium in the form of a disc or cylinder is caused to rotate in synchronism with the period of the vertical synchronizing signal in a video signal or with one-$m$th ($m$ is an integer) the period of the vertical synchronizing signal, and a signal recording current is made to flow during the record mode at intervals of time which are $p$ times ($p$ is an integer) the length of one field, while an intermittently movable recording head is held in its stopped position during the period in which the signal recording current is flowing. By this arrangement, a perfectly stationary picture or slow-motion picture which could not easily be obtained with prior video tape recorders can be reproduced as desired, and an analysis of the behaviour of an object within a short length of time can successfully be effected. In addition to the above, an analysis and observation of the behaviour of an object for a long period of time can also be effected since any desired skipping recording can be made during the recording operation. Further, a required scene of a moving picture can be recorded when the recording is manually made, and a required scene of a moving picture being reproduced on a monitoring receiver can immediately be observed in the form of a stationary reproduced picture if so required. Since these scenes can be successively recorded as different tracks of record and can be safely preserved in the recorded form, the recording medium carrying such recordings can also be used, for example, as a data file storing therein the results of X-ray examinations. Quite a large number of pictures can be recorded on a single recording disc or cylinder, and thus a recording and memory device having a wide variety of applications can be obtained when these recording media are arranged for ease of exchange therebetween.

It is therefore an object of the present invention to provide a magnetic recording and reproducing system comprising a magnetic recording medium of discal or cylindrical shape adapted to rotate in a synchronous relation with the vertical synchronizing signal in a continuous video signal, at least one magnetic head arranged for making an intermittent movement over said magnetic recording medium while engaging therewith, means for deriving from said continuous video signal a signal portion which is $n$ times ($n$ is an integer) the length of one field of said continuous video signal, and means for applying a series of derived signal portions each being $n$ times the length of one field of said video signal to said magnetic head while intermittently moving said magnetic head for thereby successively recording the derived signal portions on said magnetic recording medium as tracks in the form of concentric circles.

Another object of the present invention is to provide a magnetic recording and reproducing system comprising a magnetic recording medium of a discal or cylindrical shape adapted to rotate in a synchronous relation with the vertical synchronizing signal in a continuous video signal, at least one magnetic head arranged for making an intermittent movement over said magnetic recording medium while engaging therewith, means for separating the vertical synchronizing signal from said continuous video signal, and AND circuit whose input is said separated vertical synchronizing signal and a train of pulses having a pulse width which is $m$ times ($m$ is an integer) the period of said vertical synchronizing signal, means operative in response to the appearance of an output from said AND circuit to derive from said video signal a signal portion which is $n$ times ($n$ is an integer) the length of one field of said continuous video signal, means for applying a series of derived signal portions to said magnetic head, and means also operative in response to the appearance of the output from said AND circuit to cause the intermittent movement of said magnetic head over said magnetic recording medium.

A further object of the present invention is to provide a magnetic recording and reproducing system comprising a magnetic recording medium of a discal or cylindrical shape adapted to rotate in a synchronous relation with the vertical synchronizing signal in a continuous video signal, at least one magnetic head arranged for making an intermittent movement over said magnetic recording medium while engaging therewith, means for skippingly deriving from said video signal a series of signal portions which are each $n$ times ($n$ is an integer) the length of one field of said video signal and are derived in such a manner that said signal portions are spaced from each other by a time which is $p$ times ($p$ is an integer) the length of one field, means for successively applying the derived signal portions to said magnetic head, and means for causing the intermittent movement of said magnetic head so that, during the record mode, said magnetic head is intermittently moved in synchronism with the vertical synchronizing signal in order to successively record said derived signal portions on said magnetic recording medium as tracks in the form of concentric circles, and during the playback mode, said recorded tracks are successively reproduced while repeating a plurality of reproductions on each said track.

The above and other objects, advantages and features of the present invention will be apparent from the following detailed description of preferred embodiments thereof when considered in conjunction with the accompanying drawings, in which.

Figure 7:
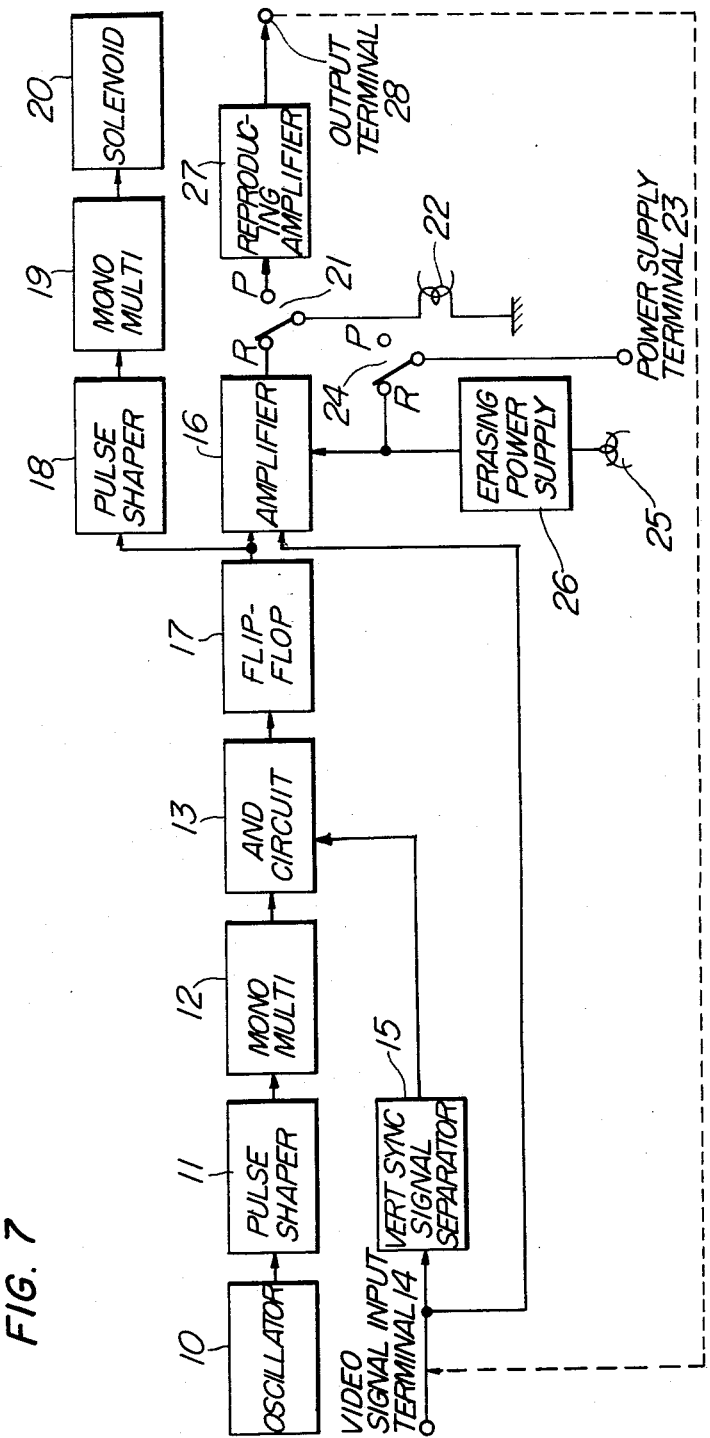
FIG. 7 is a block diagram of an electrical control system in the recording and reproducing system shown in FIG. 4.
Figure 8:
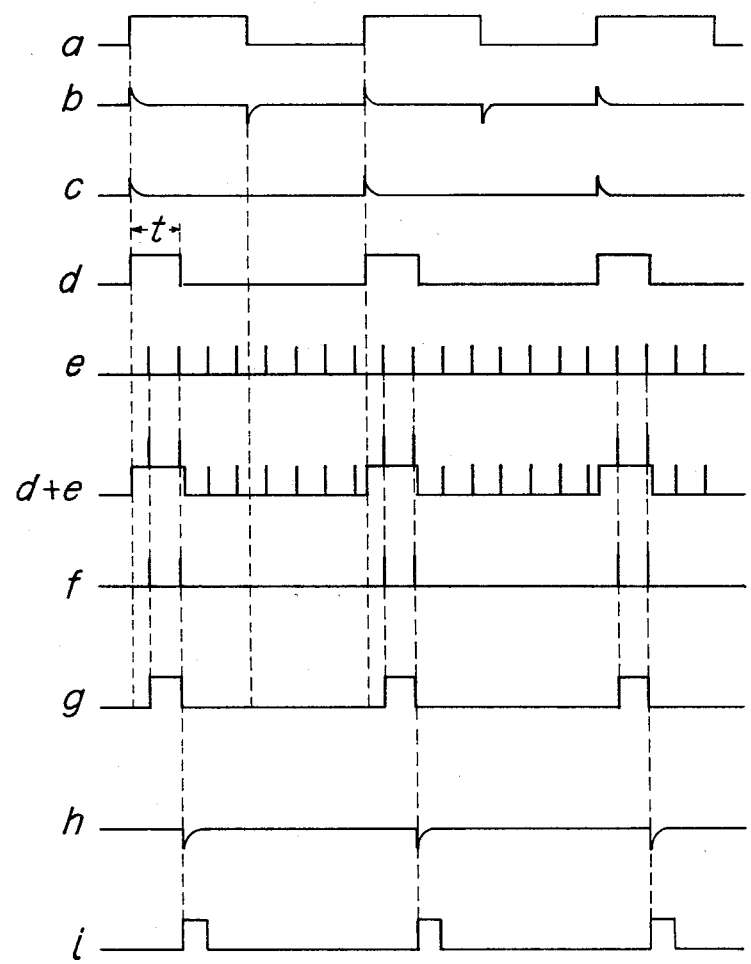
Figure 9:
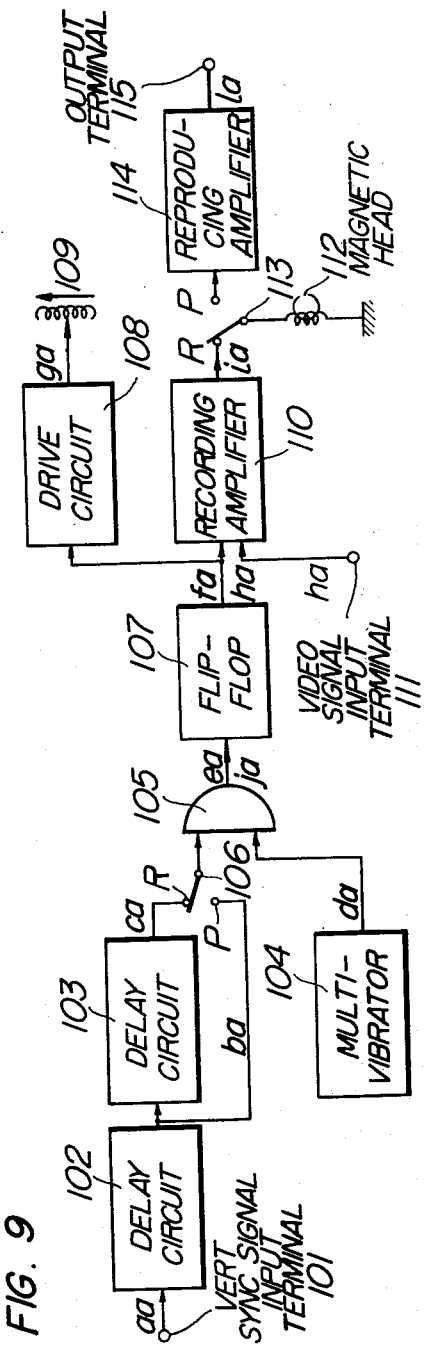
Figure 11:
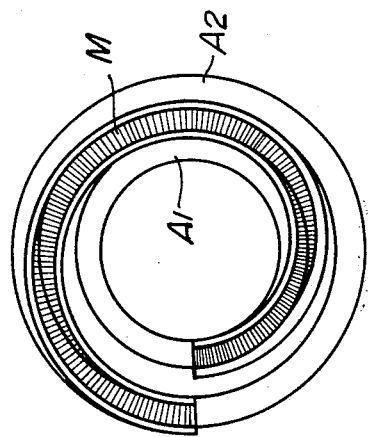
Figure 12:
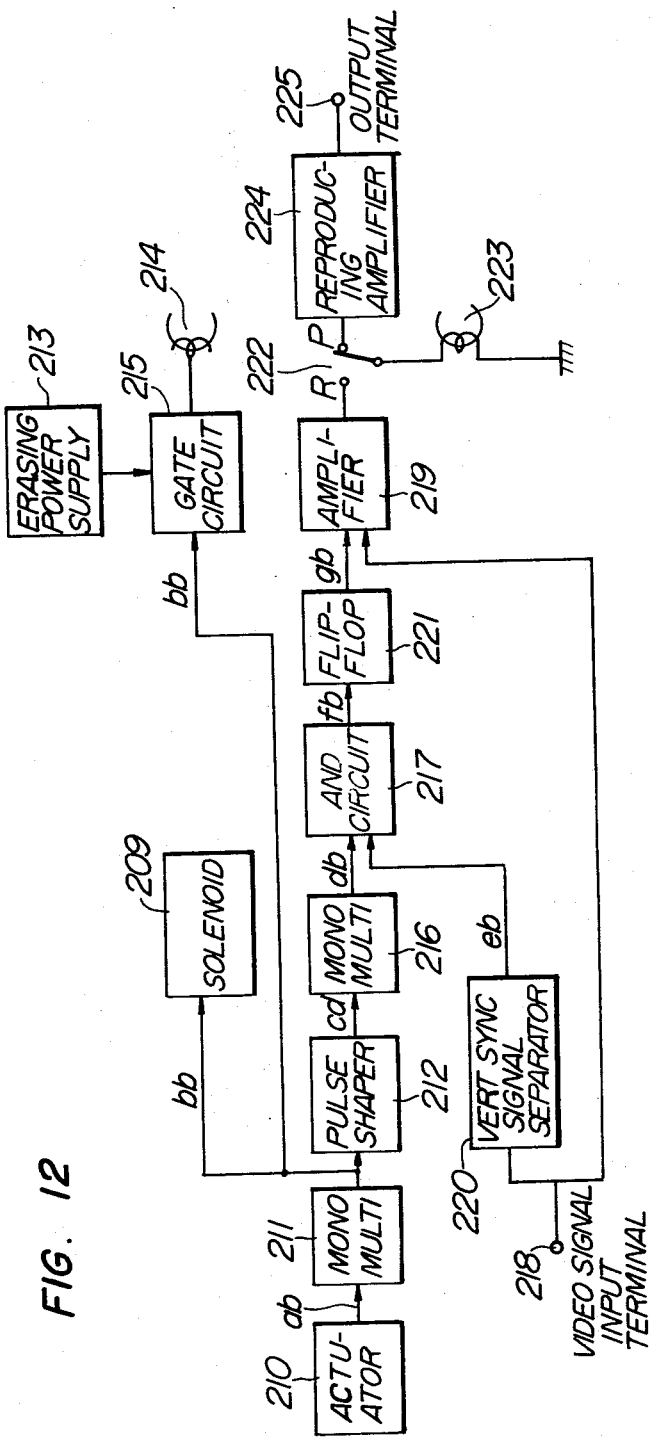
Figure 14:
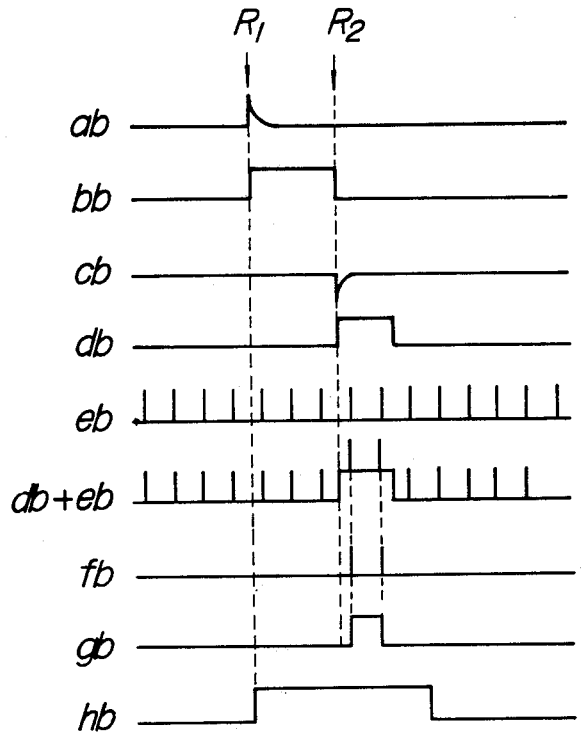
Figure 13:
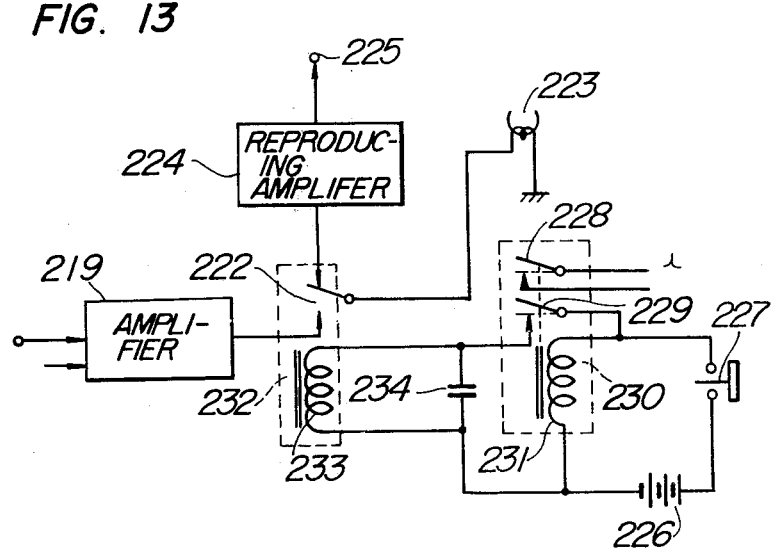
Figure 15:
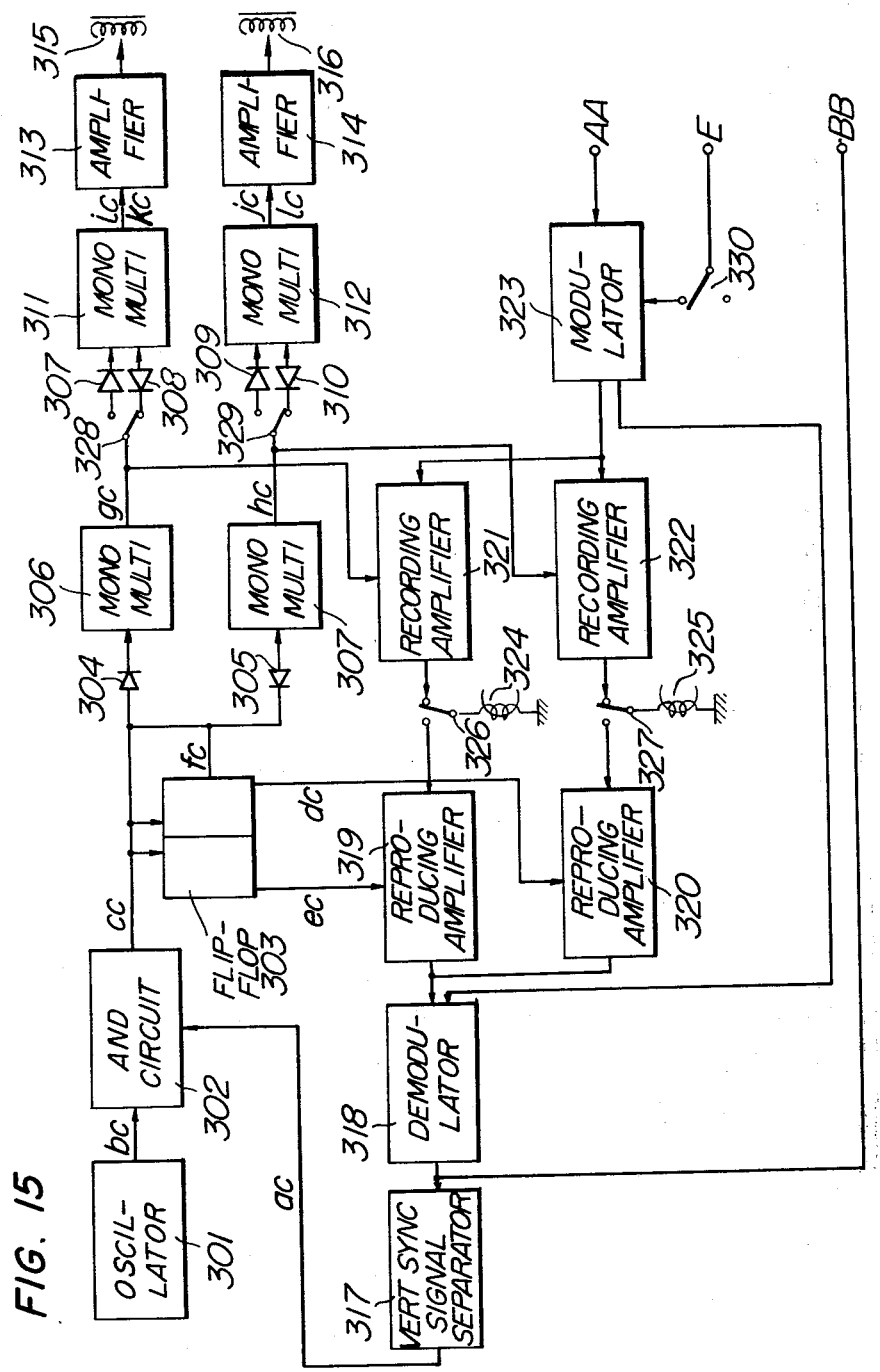

FIG. 8, including $a-e$, FIG. $d+e$, and $f-i$, is a graphic representation of waveforms for illustrating the manner of operation of the control system shown in FIG. 7;

FIG. 9 is a block diagram of an electrical control system in another embodiment of the recording and reproducing system according to the present invention;

FIG. 10 is a graphic representation of waveforms for illustrating the manner of operation of the electrical control system shown in FIG. 9;

FIG. 11 is a diagrammatic view showing a plurality of recordings provided by the system shown in FIG. 9;

FIG. 12 is a block diagram of an electrical control system in a further embodiment of the recording and reproducing system according to the present invention;

FIG. 13 is a block diagram showing details of a part of the block diagram shown in FIG. 12;

FIG. 14 is a graphic representation of waveforms for illustrating the manner of operation of the electrical control system shown in FIG. 12;

FIG. 15 is a block diagram of an electrical control system in another embodiment of the recording and reproducing system according to the present invention; and FIG. 16 is a graphic representation of waveforms for illustrating the manner of operation of the electrical control system shown in FIG. 15.

Figure 1:
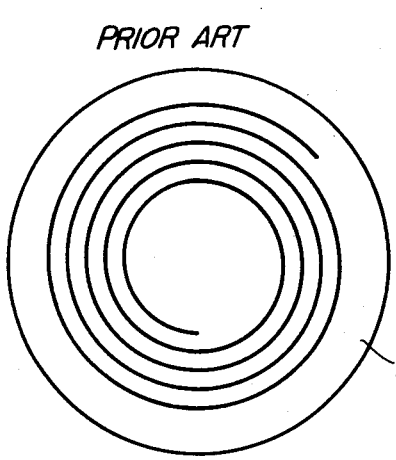
FIG. 1 is a plan view schematically illustrating a continuous track of record provided on a recording disc in accordance with the prior practice.
Figure 2:
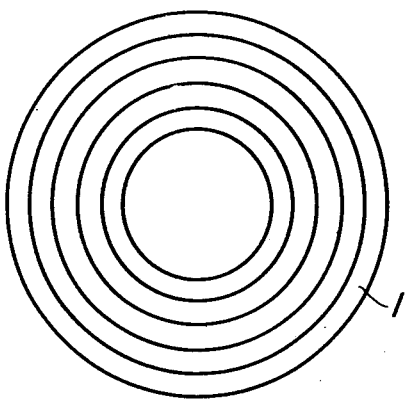
FIG. 2 is a plan view schematically illustrating a plurality of concentric tracks of record provided on a recording disc in accordance with the present invention.
Figure 3:
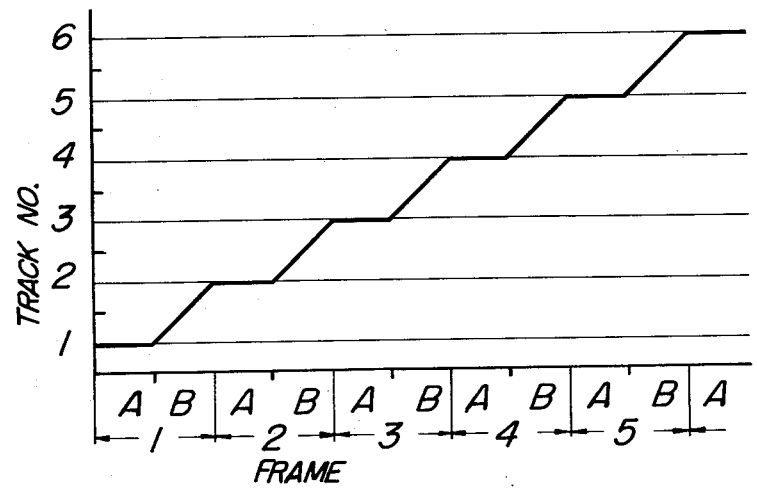
FIG. 3 is a graphic illustration of the relation between a video signal and one form of recorded tracks provided by the system according to the present invention.

Referring now to FIG. 2, there is shown a recording disc 1 on which pictures are discontinuously recorded in a concentric fashion in such a manner that the circumference of each circle represents a video signal portion which is $n$ times the length of one field where $n$ is an integer. For example, one field according to the standard television broadcasting system is recorded as a track which is in the form of one complete circumference of a circle, and shifting from the above track to the next track takes place during the next field (1/60 second) of the frame so that the first field of the next frame can then be recorded as the next track. The above operation is repeated to record a series of concentric tracks as shown in FIG. 2. The manner of recording such tracks is graphically shown in FIG. 3, from which it will be seen that the field A in each frame is successively recorded as a series of discontinuous tracks, and the switch-over from track to track is performed during the period of the field B in each frame.

During the reproduction, a slow-motion picture which has a speed $n/2$ times the speed of an ordinary picture can be obtained by continuously reproducing each track $n$ times by a magnetic head and then moving the magnetic head to the next track, while a stationary picture can be obtained by repeatedly reproducing a particular track. When it is desired to obtain an ordinary picture, one field may be reproduced by the magnetic head, the magnetic head being then moved to the next track during the next one field, and the signal representing the one field having been reproduced previously may be caused to delay by one field during the shifting period in which no reproduced signal appears so that the same signal may be reproduced twice on the cathode-ray tube to thereby obtain the desired ordinary picture. The above operation may be practised by providing another or auxiliary magnetic head which is so arranged as to reproduce the preceding one-field signal during the shifting period of the main magnetic head so that the same field can be reproduced twice, or by arranging in such a way that the signal being reproduced by the main magnetic head is recorded on a separate track and the auxiliary magnetic head reproduces the signal recorded on such a track during the period in which the main magnetic head moves from the particular track to the next. In another form of the operation, a definite medium brightness or an average brightness of the picture of the preceding field may be applied to the cathode-ray tube during the period in which no signal appears due to the shifting movement of the magnetic head. Further, a picture having a drop-out rate of $\frac{1}{2} \times n$ may be obtained by recording a video signal at intervals of $n$ fields, hence, at intervals of $n/60$ seconds and successively reproducing the recorded tracks. Moreover, a required scene of a moving picture can be recorded if so desired when the recording is manually made.

An embodiment of the present invention which is suitable for the practice of the above operations will now be described.

Figure 4:
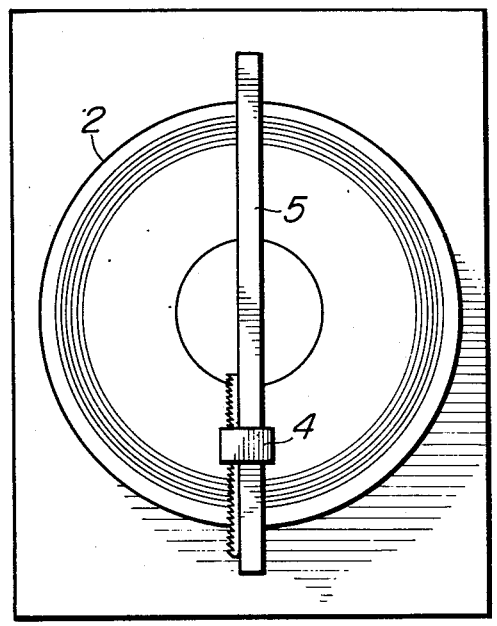
FIG. 4 is a plan view showing a general structure of an embodiment of the recording and reproducing system according to the present invention.
Figure 5:
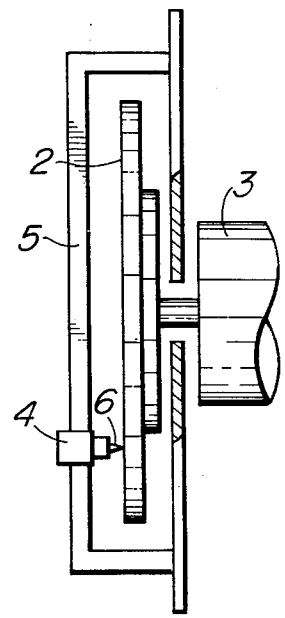
FIG. 5 is a side elevational view of the recording and reproducing system shown in FIG. 4.
Figure 6:
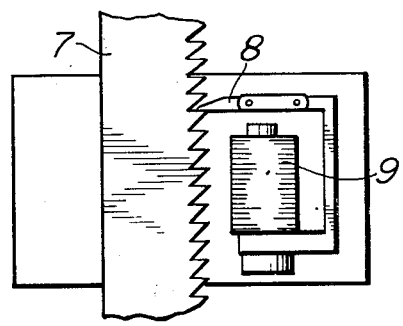
FIG. 6 is an enlarged detail view of a part of the recording and reproducing system shown in FIG. 4 for the illustration of the operating principle of the system.

One form of the mechanism for track switch-over is shown in FIGS. 4 and 5. The track switch-over mechanism includes therein a motor 3 which drives a rotatable magnetic sheet 2 of a discal shape consisting of a Mylar film having a coating of a powdery magnetic material thereon. A magnetic head drive means 4 is mounted on a frame member 5 so as to make an intermittent sliding movement over the magnetic sheet 2 in a direction transversely of the sheet 2. The magnetic head drive means 4 carries thereon a magnetic head 6 which is adapted to engage the magnetic sheet 2. The head drive means 4 comprises a finger 8 which engages a rack 7 formed on the frame member 5 as shown in FIG. 6. The finger 8 is operatively connected with a solenoid 9 so that the head drive means 4 can make its intermittent movement as required. It will however be understood that, in lieu of the mechanism described above, means such as geneva gears or a ratchet mechanism may be employed to convert a rotary movement into an intermittent linear movement.

A preferred electrical control system for use with the recording and reproducing system partly shown in FIGS. 4 and 5 will be described with reference to FIG. 7.

The electrical control system includes therein an oscillator 10 which is so constructed as to deliver an output whose oscillation frequency is freely variable. The output side of the oscillator 10 is connected with an AND circuit 13 through a pulse shaper 11 and a monostable multivibrator 12. A video signal input terminal 14 is connected with the AND circuit 13 through a vertical synchronizing signal separator 15. An amplifier 16 containing therein a gate circuit is also connected with the video signal input terminal 14. The output terminal of the AND circuit 13 is connected to a flip-flop 17 whose output is applied to the amplifier 16 containing therein the gate circuit as a gate signal and is also connected to a solenoid 20 (corresponding to the solenoid 9 in the magnetic head drive means shown in FIG. 6) through a pulse shaper 18 and a monostable multivibrator 19. The output terminal of the amplifier 16 is connected with a recording and reproducing magnetic head 22 through a switch 21. A power supply terminal 23 is connected with the amplifier 16 and an erasing power supply 26 for an erasing head 25 through a switch 24. A reproducing amplifier 27 connectable with the recording and reproducing head 22 through the switch 21 is connected with an output terminal 28.

The operation of the electrical control system will be described with reference to FIG. 8. The output of the ocillator 10 having a waveform as shown in FIG. 8a is differentiated by the pulse shaper 11 to a waveform as shown in FIG. 8b, and a pulse waveform having a positive spike relating to the leading edge of each pulse shown in FIG. 8a is then derived as shown in FIG. 8c. The pulse waveform shown in FIG. 8c is used to trigger the monostable multivibrator 12, which therefore delivers a waveform as shown in FIG. 8d. Alternatively, the waveform shown in FIG. 8d may be directly obtained by means such as a multivibrator. The monostable multivibrator 12 is so designed that its output waveform shown in FIG. 8d has a pulse width $t$ which is slightly shorter than 2/60 seconds.

When the output waveform shown in FIG. 8d and the vertical synchronizing signal, shown in FIG. 8e, separated by the vertical synchronizing signal separator 15 from a television signal to be recorded are applied to the AND circuit 13, those vertical synchronizing pulses falling within an overlapping period of these two signals, that is, two successive vertical synchronizing pulses as shown in FIG. 8f are obtained since the pulse width $t$ of the multivibrator output waveform shown in FIG. 8d is so selected as to be slightly shorter than 2/60 seconds. The signal shown in FIG. 8f is used to trigger the flip-flop 17, and the output thereof having a waveform as shown in FIG. 8g is applied to the amplifier 16 containing therein the gate circuit as a gate signal therefore. It will thus be understood that the video signal is applied to the magnetic head 22 for a limited period in which the gate signal appears.

In the meantime, the gate signal having the waveform shown in FIG. 8g is differentiated and reshaped by the pulse shaper 18 to appear as a signal having a waveform, as shown in FIG. 8h, in which a negative spike appears at a position corresponding to the trailing edge of each pulse of the signal waveform shown in FIG. 8g. The signal having the waveform shown in FIG. 8h is used to drive the monostable multivibrator 19, and the output thereof having a waveform as shown in FIG. 8i is used to energize the solenoid 20 to thereby shift the magnetic head 22 from track to track. Thus, as soon as a one-field signal has been recorded on the recording disc, the magnetic head is shifted to the next track to prepare for arrival of the next signal to be recorded.

In the present embodiment, the output waveform of the oscillator 10 is selected to have a pulse recurrence frequency which is one-eighth the pulse recurrence frequency, 60 cps, of the vertical synchronizing signal as shown in FIG. 8a, and the pulse output from the monostable multivibrator 12 has a pulse width $t$ of 2/60 seconds as shown in FIG. 8d. Therefore, every one field in the eight continuous fields is recorded with the remaining seven fields being skipped over. However, it will be apparent that the number of fields to be skipped over can be freely selected by suitably varying the oscillation frequency of the oscillator 10, and a signal representing more than one field can be recorded on the same track by widening the pulse width of the gate signal shown in FIG. 8g and reducing the number of rotations of the recording disc. Further, when it is desired to solely record a particular field, the oscillator 10 is the above circuitry may be so operated as to deliver only one output pulse for the recording of the desired one field alone.

During the playback mode, the switches 21 and 24 are urged to contact the terminals P, the power supply to the amplifier 16 and the erasing head 25 is turned off, and the magnetic head 22 is now operated to function as a reproducing head. A portion of the reproduced output from the magnetic head 22 is applied to the vertical synchronizing signal separator 15. When the reproduction is performed under a state as described above, the magnetic head 22 makes a repeated reproduction from the same track to repeatedly and continuously reproduce the one-field signal recorded on the track, and as a result, the vertical synchronizing signal having a train of pulses as shown in FIG. 8e is applied to the AND circuit 13. On the other hand, the oscillator 10 may be so operated as to deliver an output having the same oscillation frequency as in the recording. Then, the oscillator 10 operates in the same manner as in the recording, and a head-moving pulse as shown in FIG. 8h appears at intervals of seven vertical synchronizing pulses to move the magnetic head from track to track. In other words, the magnetic head 22 is automatically shifted from a track to the next after it has reproduced the recording on the former track seven times. In this connection, it will be recalled that the magnetic head 22 is shifted from track to track within a one-field period. Accordingly, a slow-motion picture of any desired speed can be obtained when every other field is recorded during the recording operation and the oscillation frequency of the oscillator 10 is suitably varied during the reproducing operation. A stationary picture may be obtained by repeatedly scanning the same track.

In the actual video recording and reproducing operation, the vertical synchronizing signal must be delayed or displaced in respect of time in order that the junction between a plurality of field signals in one track may not appear in the monitoring picture during the recording and the switch-over position of the magnetic head from track to track and may not appear in the monitoring picture during the reproduction.

An embodiment of the present invention described hereunder is proposed to deal with such a requirement.

The video signal recording and reproducing system shown in FIG. 9 comprises a vertical synchronizing signal input terminal 101, a delay circuit 102 for delaying the vertical synchronizing signal for a predetermined time, a delay circuit 103 for further delaying the output from the delay circuit 102 for a predetermined time, a multivibrator 104 for deriving a pulse signal having a pulse width which corresponds to twice the period of the vertical synchronizing signal, and an AND circuit 105 whose inputs are one of the outputs from the delay circuits 102, 103 and the output from the multivibrator 104. A change-over switch 106 is interposed between the delay circuits 102, 103 and the AND circuit 105 in order to supply the output of the delay circuit 103 during recording and to supply the output of the delay circuit 102 during reproduction. The output of the AND circuit 105 triggers a flip-flop 107 to drive the same. The flip-flop 107 is connected to a drive circuit 108 to drive the latter by the output of the former, and the output of the drive circuit 108 actuates a drive mechanism 109 which is operative to intermittently vary the position of a magnetic head 112. A recording amplifier 110 connected to a video signal input terminal 111 is actuated only when the flip-flop 107 delivers its output. The magnetic head 112 is selectively connectable with an output terminal R of the recording amplifier 110 or with an input terminal P of a reproducing amplifier 114 by means of a change-over switch 113. The reproducing amplifier 114 is connected with an output terminal 115.

The vertical synchronizing signal, consisting of a pulse train having a pulse interval $t_F$ as shown in FIG. 10aa, applied to the input terminal 101 is delayed by a time $t_P$ as shown in FIG. 10ba by the delay circuit 102 and is then further delayed by a time $T_R - T_P$ by the delay circuit 103. Therefore, the output appearing at the output side of the delay circuit 103 is delayed by a time $T_R$ as shown in FIG. 10ca compared with the original vertical synchronizing signal. During the record mode, the switches 106 and 113 are thrown to contact the respective terminals R. Thus, the signal from the multivibrator 104 having a pulse waveform as shown in FIG. 10da and the signal from the delay circuit 103 having the pulse waveform shown in FIG. 10ca are applied to the AND circuit 105, which therefore delivers an output as shown in FIG. 10ea. As a result, an output as shown in FIG. 10fa appears from the flip-flop 107. More precisely, the output pulse from the flip-flop 107 has its leading edge occurring at a time $t_F - t_R$ before a vertical synchronizing pulse and its trailing edge occurring at a time $t_F - t_R$ before the succeeding vertical synchronizing pulse. Here, $t_F$ represents the period of one field of a video signal. Since the recording amplifier 110 is urged to its energized state during the period of occurrence of such an output from the flip-flop 107, a video signal having a waveform as shown in FIG. 10ha applied to the input terminal 111 is amplified by the recording amplifier 110 and is then applied to the magnetic head 112, which therefore records the video signal during the limited period described above. Suppose now that a recording medium of a discal shape as shown in FIG. 11 is used and is adapted to rotate at a rate of $1/t_F$ per second in synchronism or substantially in synchronism with the vertical synchronizing signal, then a video signal portion corresponding to one field is recorded by one rotation of the recording medium. In other words, that portion of the video signal which is applied while the recording amplifier 110 is in its energized state can be recorded on the recording medium during one rotation thereof.

It will be understood in this connection that a video signal portion corresponding to one field can always be applied to the magnetic head 112 without any possibility of intervention of the vertical synchronizing pulse when the time $t_F - t_R$ is so set as to lie within a time covering about 40 horizontal synchronizing pulses or 40 H. By this arrangement, the junction between the fields does not appear on a monitoring screen, and any distortion in the picture occurring at the field junction due to such a factor as the time constant of the automatic frequency control in a monitoring receiver does not appear on the monitoring screen. It is thus possible to expect a stable operation.

The drive circuit 108 is operative to detect the rising edge of the output from the flip-flop 109 and thereby delivers a pulse output as shown in FIG. 10ga, from which it will be seen that the pulse delivered from the drive circuit 108 is delayed exactly by a time $t_F$ from the output pulse of the flip-flop 107. The magnetic head 112 thus remains stationary during the time in which an output appears from the recording amplifier 110 and the video signal is being applied to the magnetic head 112. The magnetic head 112 starts its shifting movement the moment the recording amplifier 110 is deenergized. Accordingly, the tracks recorded on the recording medium are concentrical with each other as shown by A1 and A2 in FIG. 11.

In this respect, it is to be noted that the head driving pulses may be delivered with a timing as shown in FIG. 10ga when one drive stroke for the head drive means is completed within a one-field period. However, where such head drive stroke is desired to be extended over a period more than one field, it will be apparent that the head driving signal shown in FIG. 10ga may be made to occur with a timing faster than the timing shown depending on the time required for the head shifting. It will however be obvious that the head drive must be completed during a period of two fields at the maximum in order to effect a satisfactory analysis of the behaviour of an object with the recording and reproducing system of the kind described.

During the playback mode, the switches 106 and 113 are thrown to contact the reproducing terminals P. In this case, the AND circuit 105, the flip-flop 107, the reproducing amplifier 114 and the drive circuit 108 deliver outputs as shown in FIGS. 10ja, 10ka, 10la and 10ma, respectively, and it is possible to reproduce each field of the video signal over a time corresponding to the time of several fields and thus to easily obtain a slow-motion picture.

Consider now a situation taking place in the switch-over of the magnetic head 112 from track to track. Suppose that the magnetic head 112 is shifted from one track to another at a uniform speed, then the locus of the magnetic head drawn by the shifting movement thereof will be as shown by M in FIG. 11. The position of switch-over from track $A_1$ to track $A_2$ in FIG. 11 corresponds to a concave portion in the reproduced waveform shown in FIG. 10*la*. A head switch-over noise momentarily occurring during the switch-over of the magnetic head from track to track can not appear on the monitoring screen when the head switch-over position is so set as to lie within a period covering about 40 horizontal synchronizing pulses before a vertical synchronizing pulse. The magnetic head may be shifted at a non-uniform speed in lieu of the uniform speed referred to in the above. It will thus be obvious that the above method is quite effective for the recording and reproduction of a video signal.

The techniques disclosed hereinbefore may be applied to a manual recording in order to record a required scene of a moving picture and to immediately obtain a stationary reproduced picture. An embodiment suitable for the practice of the manual recording will be described with reference to an electrical control system therefor shown in FIGS. 12 and 13.

The recording and reproducing system comprises an actuator 210 which has a structure as shown in FIG. 13. The actuator 210 is adapted to deliver a pulse as shown in FIG. 14*ab* in response to a depression of a push button. This pulse triggers a monostable multivibrator 221, which delivers a pulse waveform as shown in FIG. 14*bb*. The pulse waveform shown in FIG. 14*bb* has a pulse width which is slightly larger than twice the pulse internal of the vertical synchronizing pulses, and hence is slightly larger than one frame. This pulse waveform is applied to a solenoid 209 (corresponding to the solenoid 9 for the magnetic head drive means shown in FIG. 6) and to a pulse shaper 212. The above pulse is also applied to a gate circuit 215 as a gate signal for controlling the power supply from an erasing power supply 213 to an erasing head 214. The pulse shaper 212 is connected with an AND circuit 217 through a monostable multivibrator 216. An input terminal 218 for a television signal to be recorded is connected with an amplifier 219 containing therein a gate circuit and also with the AND circuit 217 through a vertical synchronizing signal separator 220. The output terminal of the AND circuit 217 is connected through a flip-flop 221 with the amplifier 219 containing therein the gate circuit in order to apply a gate signal thereto. The output terminal of the amplifier 219 is connected with a recording and reproducing magnetic head 223 through a change-over switch 222 which is changed over in an interlocked relation with the actuator 210 in a manner as will be described later. During the playback mode, the magnetic head 223 is connectable with a reproducing amplifier 224 by means of the above switch 222. The reproduced signal appears at an output terminal 225.

The actuator 210 has a structure as shown in FIG. 13. The actuator 210 comprises a series circuit of a power supply 226, a push button switch 227, and a relay 230 having a relay coil 231 and two movable iron bars 228 and 229. A series circuit including the movable iron bar 229 and a relay coil 233 of another relay 232 is connected in parallel with the relay coil 231 of the relay 230, while a condenser 234 is connected in parallel with the relay coil 233 of the relay 232. The change-over switch 222 described with reference to FIG. 12 is so arranged that it is brought into contact with the terminal R of the amplifier 219 only when a predetermined voltage is applied across the relay coil 233. The condenser 234 is operative to maintain the relay 232 in its energized state for a predetermined time (corresponding to a period as shown in FIG. 14*hb*) even after the force imparted to the push button 227 has been released.

The recording and reproducing system shown in FIGS. 12 and 13 operates in a manner as described below. A person viewing a scene appearing on a monitoring receiver may merely depress the push button switch 227 (FIG. 13) in the actuator 210 when he wants to observe and record a particular scene as a stationary picture. Suppose that the push button 227 is depressed at a time R1, then a pulse as shown in FIG. 14*ab* appears and is applied to the monostable multivibrator 211. At the same time, the relay 232 is energized to connect the magnetic head 223 with the amplifier 219. The pulse shown in FIG. 14*ab* triggers the monostable multivibrator 211, whose output pulse having the waveform shown in FIG. 14*bb* is applied to the solenoid 209 in the head drive means to thereby shift the magnetic head 223 from one track to another. This pulse is also applied to the gate circuit 215 as a gate signal so that the erasing power supply 213 supplies a current to the erasing head 214 for a limited period corresponding to the duration of the pulse, and thus the recording on the particular track is erased.

The pulse shown in FIG. 14*bb* is also applied to the pulse shaper 212, from which a pulse as shown in FIG. 14*cb* having a spike appearing at a time R2 corresponding to the falling edge of the pulse in FIG. 14*bb* or appearing at a time later than the time R2 is delivered. The pulse shown in FIG. 14*cb* triggers the monostable multivibrator 216 in order to obtain therefrom a pulse, as shown in FIG. 14*db*, having a pulse width slightly smaller than twice the pulse interval of the vertical synchronizing pulses. Such a pulse is then applied to the AND circuit 217.

In the meantime, the vertical synchronizing signal consisting of a train of pulses as shown in FIG. 14*eb* is separated from the video signal by the vertical synchronizing signal separator 220 and is applied to the AND circuit 217. As a result, the AND circuit 217 delivers an output which consists of two consecutive pulses of the vertical synchronizing signal as shown in FIG. 14*fb*, and such an output is used to trigger the flip-flop 221 to derive a pulse, as shown in FIG. 14*gb*, which has a pulse width corresponding to one field. The pulse shown in FIG. 14*gb* is applied to the amplifier 219 containing therein the gate circuit as a gate signal therefor, so that the video signal is applied to the magnetic head 223 for a limited period corresponding to one field. Thus, that portion of the video signal which corresponds to one field is recorded on the magnetic sheet 1 (FIG. 2), and a one-field signal can be recorded as one circumference of each circle when the magnetic sheet 1 is adapted to rotate at a number of rotations which is in synchronism with the vertical synchronizing signal.

In some time after the completion of the recording, the relay 232 is deenergized and the switch 222 automatically connects the magnetic head 223 with the reproducing amplifier 224 so that the recorded one-field video signal is repeatedly reproduced to provide a stationary picture.

In the present embodiment, illustration has been given with respect to the case of the automatic recording and reproduction in response to a depression of the push button 227. However, an arrangement comprising two steps of button actuation may be employed, in which, by the first actuation of the push button at the time R1 in FIG. 14, the magnetic head is shifted and a previous recording is erased to prepare a fresh track for receiving a recording thereon, and when a viewer looking at a monitoring receiver desires to observe and record a particular scene as a stationary picture, the viewer makes the second actuation of the push button at the time R2 in FIG. 14 in order to record one field of the picture signal and to immediately derive the scene as a stationary reproduced picture. The time interval between R1 and R2 is an interval at which the button is successively actuated and may be freely selected as a matter of course.

The above system is adapted to record a desired part of a scene, and after recording, to immediately observe that part of the scene as a stationary reproduced picture. However, an arrangement may be employed in which the magnetic head is held in its recording state after the time R1 until it is switched over to its reproducing state, and when a desired part of a moving scene appears while observing a monitoring receiver, the push button may be depressed at any desired time R2 in order to record a one-field picture, the magnetic head being then shifted to another track immediately after the completion of the recording to prepare for the next recording. By this arrangement, any desired parts of the monitoring picture can be sampled and recorded one after another as a series of one-field pictures.

The foregoing description has referred to embodiments having a single magnetic head. However, in the system of the kind described which is arranged to draw concentric tracks of record by a single magnetic head, the tracks themselves are discontinuous and independent of each other. Therefore, a defect may arise from the fact that a transient noise may be developed in the no-signal region travelled by the head during the shifting from track to track and that every other signal portion corresponding to one field of a television signal to be recorded is dropped out.

Such a defect may be eliminated by arranging in such a manner that two or more magnetic heads may be successively switched over for the alternate recording and reproduction of one-field signals. More precisely, a first magnetic head may be held in its stationary state for the recording of a one-field signal portion, while a second magnetic head may be shifted by a distance which is twice the sum of the track width and the track-to-track spacing (guard band) during the above recording by the first magnetic head, and the first magnetic head may then be shifted by the same distance as that travelled by the second magnetic head when the second magnetic head has completed its shifting movement and is held in its stationary position for the recording of the next one-field signal portion. During the playback mode, the magnetic heads may be shifted in the same manner for the reproduction of the recorded pictures, in which case a reproducing amplifier associated with one magnetic head which is held in the stationary position may be urged to its operative state, while another reproducing amplifier associated with the other magnetic head which is being shifted may be urged to its nonoperative state.

An embodiment which is adapted to make such an operation as described above will be described with reference to FIG. 15.

Referring to FIG. 15, the recording and reproducing system comprises an oscillator 301 which can be so set as to provide any desired slow-motion speed or any desired number of skipped fields for skippingly recording the desired fields of a television signal. The oscillator 301 may, for example, be an astable multivibrator and delivers a pulse signal having a pulse width corresponding to a time of about one field as shown in FIG. 16bc. During the record mode, power from a power supply E is supplied to a modulator 323 through a record-reproduce change-over switch 330, so that a television signal applied to an input terminal AA is modulated by the modulator 323, amplified by recording amplifiers 321 and 322, and then applied to respective magnetic heads 324 and 325 through associated record-reproduce change-over switches 326 and 327. In the meantime, the output from the modulator 323 is applied through a demodulator 318 to a vertical synchronizing signal separator 317, where the vertical synchronizing signal shown in FIG. 16ac is solely derived. The vertical synchronizing signal shown in FIG. 16ac and the output from the oscillator 301 shown in FIG. 16bc are applied to an AND circuit 302, which therefore delivers a pulse signal as shown in FIG. 16cc. Upon application of the pulse signal shown in FIG. 16cc to a flip-flop 303, the flip-flop 303 delivers output signals having opposite polarities as shown in FIGS. 16dc and 16ec. These output signals shown in FIGS. 16dc and 16ec are used for the gating operation of respective reproducing amplifiers 319 and 320. A signal as shown in FIG. 16fc having positive and negative spikes representing the rising edge and the falling edge of the output signal shown in FIG. 16dc is applied through diodes 304 and 305 to respective monostable multivibrators 306 and 307. Thus, the monostable multivibrators 306 and 307 deliver respective pulse signals having a pulse width corresponding to a one-field period as shown in FIGS. 16gc and 16hc. These output signals from the respective monostable multivibrators 306 and 307 are applied to the recording amplifiers 321 and 322 for the alternate gating of the latter, so that the successive fields of the television signal can be recorded by the magnetic heads 324 and 325 in an alternate fashion. At the same time, the output signals shown in FIGS. 16gc and 16hc delivered from the monostable multivibrators 306 and 307 are applied through record-reproduce change-over switches 328, 329 and diodes 308, 310 to monostable multivibrators 311 and 312, respectively. These signals are then amplified by amplifiers 313 and 314 to appear as signal waveforms as shown in FIGS. 16ic and 16jc, respectively. The signals shown in FIG. 16ic and 16jc are used to energize drive means 315 and 316 such as solenoids for causing the shifting movement of the respective magnetic heads 324 and 325. Thus, the two magnetic heads 324 and 325 can alternately be driven as described previously.

During the playback mode, the outputs from the magnetic heads 324 and 325 are directly applied to the reproducing amplifiers 319 and 320 through the record-reproduce change-over switches 326 and 327, respectively, and thus the desired video signal appears at an output terminal BB after being passed through the demodulator 318. In the reproducing operation, the flip-flop 303 makes its predetermined operation to alternately switch over the outputs from the magnetic heads 324 and 325 and to cause the alternate shifting of the magnetic heads 324 and 325. The outputs from the respective monostable multivibrators 311 and 312 in the reproducing operation have waveforms as shown in FIGS. 16kc and 16lc.

It will thus be understood that the operation of the present embodiment is such that, while one magnetic head is held in its stationary position for the reproduction of a recording, the other magnetic head is being shifted to the next track, and a continuous signal can be reproduced from the concentric tracks by the alternate shifting movement of the magnetic heads. By virtue of the fact that the magnetic head making its shifting movement from track to track is placed in an electrically cutoff state, it is possible to eliminate a noise that may be induced during the shifting movement of the magnetic head and to expect always a stable and satisfactory operation.

It will be understood from the foregoing detailed description that, in the present invention, a continuous television signal is successively recorded on a recording medium of discal or cylindrical shape as tracks of concentric circles by skipping over those field portions which are $p$ times ($p$ is an integer) one field, and during the playback mode, the tracks are successively reproduced by repeatedly scanning each track a plurality of times. It will be appreciated therefore that not only a television signal according to the standard system can be recorded and reproduced at a rate at which such television signal is broadcast, but also a portion of the television signal can be reproduced as a slow-motion picture or a stationary picture if so required and any desired skipped recording of the television signal can be made.

What is claimed is:

1. A magnetic recording and reproducing system comprising a magnetic recording medium of a discal or cylindrical shape adapted to rotate in a synchronous relation with the vertical synchronizing signal in a continuous video signal, at least one magnetic head arranged for making an intermittent movement over said magnetic recording medium while engaging therewith, means for skippingly deriving a series of signal portions which are each $n$ times ($n$ is an integer) the length of one field of said continuous video signal and are derived in such a manner that said signal portions are spaced from each other by a time which is $p$ times ($p$ is an integer) the length of one field, means for successively applying the derived signal portions to said magnetic head, means for generating a pulse signal having a pulse width which is larger than the period of but smaller than two times the period of the vertical synchronizing signal, an AND circuit, and means for causing the intermittent movement of said magnetic head so that, during the record mode, said magnetic head is intermittently moved in synchronism with the vertical synchronizing signal in order to successively record said derived signal portions on said magnetic recording medium on circular tracks about the center of rotation of said recording medium, and during the playback mode, the vertical synchronizing signal derived from the signal reproduced from said recorded tracks and said pulse signal are supplied to said AND circuit, the output from said AND circuit being used to successively move said magnetic head from track to track for thereby successively reproducing said recorded tracks while repeating a plurality of reproductions on each said track--.

2. A magnetic recording and reproducing system comprising a magnetic recording medium of a discal or cylindrical shape adapted to rotate in a synchronous relation with the vertical synchronizing signal in a continuous video signal, at least one magnetic head arranged for making an intermittent movement over said magnetic recording medium while engaging therewith, means for separating the vertical synchronizing signal from said continuous video signal, means for delaying said separated vertical synchronizing signal by a time which is more than one vertical scanning period minus forty horizontal scanning periods but less than one vertical scanning period in order to deliver a delayed signal, means for generating a pulse signal having a pulse width which is two times the period of said vertical synchronizing signal, an AND circuit whose inputs are said delayed signal and said pulse signal, means operative in response to the appearance of an output from said AND circuit to derive from said continuous video signal a signal portion which corresponds to one field of said video signal, means for applying a series of derived signal portions to said magnetic head, and means for causing the intermittent movement of said magnetic head for thereby successively recording the one-field video signal portions on said magnetic recording medium on circular tracks about the center of rotation of said recording medium.

3. A magnetic recording and reproducing system comprising a magnetic recording medium of a discal or cylindrical shape adapted to rotate in a synchronous relation with the vertical synchronizing signal in a continuous video signal, at least one magnetic head arranged for making an intermittent movement over said magnetic recording medium while engaging therewith, means for separating the vertical synchronizing signal for said continuous video signal, means for delaying said separated vertical synchronizing signal by a time which is more than one vertical scanning period minus 40 horizontal scanning periods but less than one vertical scanning period in order to deliver a delayed signal, means for generating a pulse signal having a pulse width which is two times the period of said vertical synchronizing signal, an AND circuit whose inputs are said delayed signal and said pulse signal, a flip-flop operative by receiving an output from said AND circuit, means operative in response to the appearance of an output from said flip-flop to derive from said continuous video signal a signal portion which corresponds to one field of said video signal, means for applying a series of derived signal portions to said magnetic head for the recording thereof, and means also operative in response to the appearance of the output from said flip-flop to cause the intermittent movement of said magnetic head after the completion of the recording of each said signal portion for thereby successively recording the one-field video signal portions on said magnetic recording medium on circular tracks about the center of rotation of said recording medium.

4. A magnetic recording and reproducing system comprising a magnetic recording medium of a discal or cylindrical shape adapted to rotate in a synchronous relation with the vertical synchronizing signal in a continuous video signal, at least one magnetic head arranged for making an intermittent movement over said magnetic recording medium while engaging therewith, means for skippingly deriving from said continuous video signal a series of signal portions which are each $n$ times ($n$ is an integer) the length of one field of said continuous video signal and are derived in such a manner that said signal portions are spaced from each other by a time which is $p$ times ($p$ is an integer) the length of one field, means for successively applying the derived signal portions to said magnetic head, means for suitably delaying the vertical synchronizing signal derived from the signal to be reproduced in the reproducing operation, means for generating a pulse signal having a pulse width which is larger than the period of but smaller than two times the period of the vertical synchronizing signal, an AND circuit whose inputs are said delayed signal and said pulse signal, and means operative in response to the appearance of an output from said AND circuit to deliver a signal in order to cause the intermittent movement of said magnetic head so that, during the record mode, said magnetic head is intermittently moved in synchronism with the vertical synchronizing signal in order to successively record said derived signal portions on said magnetic recording medium on circular tracks about the center of rotation of said recording medium, and during the playback mode, said magnetic head is driven by the signal delivered from said last-mentioned means and is thereby switched over from one recorded track to another at a time within forty horizontal scanning periods before the vertical fly-back line.

5. A magnetic recording and reproducing system comprising a magnetic recording medium of a discal or cylindrical shape adapted to rotate in a synchronous relation with the vertical synchronizing signal in a continuous video signal, at least one magnetic head arranged for making an intermittent movement over said magnetic recording medium while engaging therewith, means operative in response to the actuation of a first actuating push button at the beginning of the recording to cause the movement of said magnetic head and to urge said magnetic head to its recordable state, means operative in response to the actuation of a second actuating push button at the completion of the above movement of said magnetic head to deliver a pulse signal, means for separating the vertical synchronizing signal from said continuous video signal, an AND circuit whose inputs are said separated vertical synchronizing signal and said pulse signal, means operative in response to the appearance of an output from said AND circuit to control a gate circuit, whereby a signal portion which is $n$ times ($n$ is an integer) the time interval of the vertical sychronizing pulses in said continuous video signal is derived from said continuous video signal, means for applying a series of derived signal portions to said magnetic head for thereby recording each said signal portion on said magnetic recording medium as a circular track of record, and means for automatically switching over said magnetic head to its reproducing state upon completion of the recording, whereby said magnetic head repeatedly reproduces said recorded signal to provide a stationary picture.

* * * * *